US006341874B1

(12) United States Patent  (10) Patent No.: US 6,341,874 B1
Rubin  (45) Date of Patent: Jan. 29, 2002

(54) COMBINATION SAFETY STROBE DEVICE

(76) Inventor: Robert S. Rubin, 960 N. Lake Shore Dr., Lake Bluff, IL (US) 60044

( * ) Notice: Subject to any disclaimer, the term of this patent is extended or adjusted under 35 U.S.C. 154(b) by 0 days.

(21) Appl. No.: 09/489,427

(22) Filed: Jan. 21, 2000

(51) Int. Cl.⁷ .............................................. F21V 21/08
(52) U.S. Cl. ...................... 362/103; 362/104; 362/363; 362/800; 362/806
(58) Field of Search .................................. 362/806, 800, 362/809, 363, 362, 190, 186, 191, 103, 104, 240, 249, 184, 185

(56) References Cited

U.S. PATENT DOCUMENTS

| 2,306,419 | A | * | 12/1942 | Worth ......................... 362/109 |
| 2,355,247 | A | * | 8/1944 | Slocum ....................... 362/158 |
| 2,381,520 | A | * | 8/1945 | Saunders ...................... 441/16 |
| 3,355,582 | A | * | 11/1967 | Swee .......................... 362/190 |
| 3,383,503 | A |   | 5/1968 | Montgomery |
| 3,508,040 | A |   | 4/1970 | Bertrams |
| 3,689,758 | A |   | 9/1972 | Power |
| 4,930,052 | A |   | 5/1990 | Beige |
| 5,193,896 | A |   | 3/1993 | Oberlander |
| 6,086,218 | A | * | 7/2000 | Robertson ..................... 362/157 |

* cited by examiner

Primary Examiner—Sandra O'Shea
Assistant Examiner—John A Ward
(74) Attorney, Agent, or Firm—Mark E. Wiemelt

(57) ABSTRACT

This invention is for a novel combination safety strobe device 10 adapted for use on a pet collar 30, a backpack 32, a key chain 34 an article of clothing 36, the combination safety strobe device 10 comprising a housing 12 having a circular opening 46 at a top end 48 and an inner cavity 50 therein, the housing 12 allowing light to pass therethrough; a neck portion 14 having a top end 52, a bottom end 54 and a passageway 56 the bottom end 54 being sized to match the opening 46 of the housing 12 and being attached thereto; a cylindrical casing 16 having an open end 58 and a closed end 60, the cylindrical casing 16 being fitted within the housing 12 through the neck portion 14, the closed end 60 of the cylindrical casing 16 being positioned within the inner cavity 50 of the housing 12, the open end 58 of the cylindrical casing 16 being flush with the bottom end 54 of the neck portion 14 to provide a continuous passageway 56 therebetween; means 18 for lighting the housing 12, the lighting means 18 being secured within the inner cavity 50 of the housing 12; means 20 for powering the lighting means 18, the powering means 20 being removably secured within the cylindrical casing 16; circuitry 22 for electrically connecting the powering means 20 and the lighting means 18; means 24 for activating the lighting means 18, the activating means 24 being engaged with the powering means 20 to alternatively activate and deactivate the lighting means 18; means 26 for covering the top end 52 of the neck portion 14; and means 28 for removably securing the strobe device 10 to one of the pet collar 30, the backpack 32, the key chain 34 or the article of clothing 36, wherein the securing means 28 is secured to the covering means 26.

29 Claims, 7 Drawing Sheets

COMBINATION SAFETY STROBE DEVICE

FIELD OF THE INVENTION

This invention is directed to portable lighting devices having multiple uses. In particular, the present invention is for a combination safety strobe device that is visible from 360 degrees around the device. The novel device may be secured to a pet collar, a backpack, a key chain or an article of clothing to increase the visibility of the wearer during nighttime and under water.

BACKGROUND OF THE INVENTION

When a person or a pet is outdoors during the evening, they may not be visible to automobile drivers and other people. This is especially true from behind the person or domesticated animal. Carrying a flashlight may be cumbersome and inconvenient, and this option is impractical for pets. Additionally, flashlights have limited effectiveness because they only provide light in the direction in which they are pointed.

Other lighting devices known in the art fail to achieve the optimal effect of protecting the person or pet from 360 degrees around, or they are only effective as ornamental lights. For instance, U.S. Pat. No. 5,193,896 discloses a wristband personal lighting device that resembles a watch or may alternatively be used with a clip to secure to a person's belt. This patent only provides light in a unidirectional manner, thus failing to protect the wearer from 360 degrees around. U.S. Pat. Nos. 4,930,052, 3,689,758 and 3,383,503 disclose ornamental lighted earrings. These three patents may only be secured to the wearer's ear, thus providing only a limited benefit for people who wear earrings.

Thus, there exists a need for a personal lighting device visible from 360 degrees around that is light, sturdy and well-secured to articles of clothing, pet collars, key chains and backpacks. There is also a need for a lighting device that is waterproof in the event the wearer of the device encounters rain or snow, or other inclement weather, or the wearer of the device ventures into the water, such as a pool, lake, river, ocean, etc.

BRIEF SUMMARY OF THE INVENTION

The instant invention overcomes the shortcomings of existing devices in that it has multiple uses and is visible from 360 degrees around the novel combination safety strobe device 10. Specifically, the present strobe device 10 may be secured to a pet collar 30, a backpack 32, a zipper 40, a key chain 34 or an article of clothing 36. One embodiment of the present invention comprises a translucent spherical housing 12 having a circular opening 46 at its top end 48 and an inner cavity 50 therein; a threaded neck portion 14 having a top end 52 and a bottom end 54, wherein the bottom end 54 is attached to the circular opening 46 of the spherical housing 12; a cylindrical casing 16 placed within the spherical housing 12 such that an open end 58 of the cylindrical casing 16 is positioned to be flush with the bottom end 54 of the neck portion 14 and attached thereto, while a closed end 60 of the cylindrical casing 16 is placed within the inner cavity 50 of the spherical housing 12, whereby a passageway 56 forms between the open 58 and closed 60 ends of the cylindrical casing 16 that continues to the neck portion 14; means 18 for lighting the spherical housing 12 secured within the inner cavity 50 of the spherical housing 12; means 20 for powering the lighting means 18, wherein the powering means 20 is placed inside the passageway 56 of the cylindrical casing 16; circuitry 22 for electrically connecting the powering means 28 and the lighting means 18; means 24 for activating the lighting means 18; means 26 for covering the top end 52 of the neck portion 14; and means 28 for removably securing the novel strobe device 10 to the pet collar 30, backpack 32, key chain 34, zipper 40 or article of clothing 36.

Another embodiment of the present invention comprises securing a rubber cap 112 over the covering means 26 to form a waterproof combination safety strobe device 10.

It is, therefore, an object of the present invention to teach a combination strobe device that provides a safety light during the nighttime and can be viewed from 360 degrees around the novel device.

Another object of this invention is to teach a combination safety strobe device that has numerous uses.

It is also an object of the instant invention to teach a combination safety strobe device that may be secured to a pet collar, a backpack, a zipper, a key chain or an article of clothing.

A further object of the present invention is to teach a combination safety strobe device that is sturdy and yet light weight to facilitate personal usage.

It is another object of this invention to teach a combination safety strobe device that is waterproof to withstand inclement weather or submersion under water.

It is a further object of the instant invention to teach a combination safety strobe device that is air-tight and can float on water.

Other objects, features and advantages of the present invention will become readily apparent from the following detailed description and accompanying drawings.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention. Those skilled in the art will appreciate that the conception, upon which this disclosure is based, may readily be utilized as a basis for the designing of other devices for carrying out the several purposes of the present invention. It is important, therefore, that the invention be regarded as including such equivalent constructions insofar as they do not depart from the spirit and scope of the present disclosure.

DETAILED DESCRIPTION OF THE INVENTION

Figure 1:
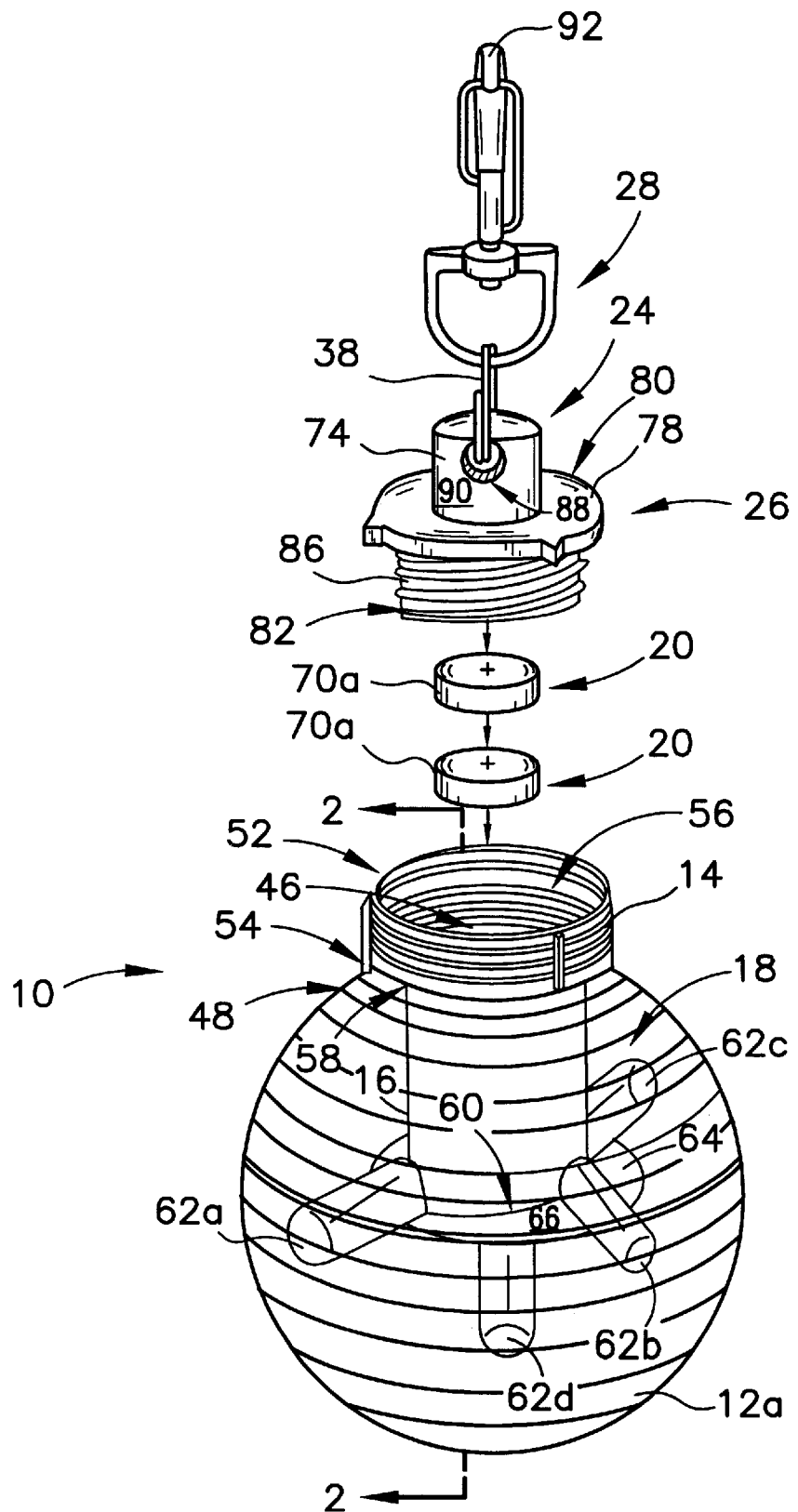
FIG. 1 is a perspective view illustrating the novel combination safety strobe device 10.

Referring to the drawings, FIG. 1 illustrates a perspective view of one embodiment of the combination safety strobe device, shown generally as 10. The novel device 10 comprises a housing 12, a neck portion 14, means 26 for covering the neck portion 14, and means 28 for removably securing the strobe device 10 to either a pet collar 30 (not shown), a backpack 32 (not shown), a key chain 34 (not shown), or an article of clothing 36 (not shown). The specific embodiment illustrated in FIG. 1 shows the safety strobe device 10 that can be used as a key chain 34 (not shown) through the use of a link 38, which is known in the art. Additionally, the securing means 28 may be removably secured to a zipper 40 (not shown) on a backpack 32 (not shown) or a belt loop 42 on pants (not shown), both of which are known in the art.

The dotted lines within the housing 12 in FIG. 1 illustrate a cylindrical casing 16, means 18 for lighting the housing 12, and a circuit board 64. Also shown is a means 24 for activating the lighting means 18 secured through the covering means 26. Located within the cylindrical casing 16 is a means 20 for powering the lighting means 18. Attached on the circuit board 64 is circuitry 22 (not shown in FIG. 1) for electrically connecting the powering means 20 and the lighting means 18.

The housing 12 shown in FIG. 1 is a preferred translucent housing 12 having a circular opening 46 (shown in FIG. 2) at its top end 48. Inside of the housing 12 is the inner cavity 50 (shown in FIG. 2). It is most preferred that the housing 12 be a spherical housing 12. The housing 12 should be made of a substance that is strong, yet light, such as plastic. This substance should also allow the housing 12 to float on water. When the housing 12 is spherical, each half 12a and 12b (shown in FIG. 2) of the housing 12 may be welded or glued together, as is known in the art, once the cylindrical casing 16 and neck portion 14 are properly in place. This will ensure that the housing is airtight and waterproof. The most preferred type of welding comprises ultrasonic welding that is known in the art.

The neck portion 14 of the novel device 10 has a top end 52, a bottom end 54 and a passageway 56 (shown in FIG. 2) connecting each end. The bottom end 54 should be sized so that it matches the opening 46 (shown in FIG. 2) of the housing 12 when attached thereto. It is most preferred that the neck portion 14 be threaded therein for securing to the covering means 26 (shown in FIG. 2). Similar to the housing 12, the neck portion 14 should also be made of a plastic substance that is light and strong. The neck portion 14 should be attached to the housing 12 by welding or gluing so that this attachment is airtight, as is known in the art. The most preferred type of welding comprises ultrasonic welding that is known in the art.

The cylindrical casing 16 should have an open end 58 and a closed end 60, whereby the closed end 60 is positioned in the inner cavity 50 of the housing 12 and the open end 58 is attached to the bottom end 54 of the neck portion 14 to form a continuous passageway 56 therebetween. This attachment should be done by either gluing or welding, as is known in the art, so that the seam formed is airtight. The most preferred way to attach the cylindrical casing 16 to the neck portion 14 is by ultrasonic welding, which is known in the art. The cylindrical casing 16 should also be made of a plastic substance, or any other substance that is light, yet strong.

Still referring to FIG. 1, the activating means 24 is utilized to alternately activate (turn on) and deactivate (turn off) the lighting means 18. The preferred activating means 24 comprises a plunger mechanism 74 that is pressed downward on the powering means 20 (shown in FIG. 2) to activate and deactivate the circuitry 22 on a preferred circuit board 64 (illustrated in greater detail in FIGS. 3 and 4). In operation, when the plunger mechanism 74 is pressed downward, this causes the powering means 20 in the cylindrical casing 16 to, in turn, put downward pressure on a contact 76 (shown in FIG. 2) attached to the circuit board 64, which sends electrical pulses to the circuitry 22, most preferably the internal circuitry (IC) (not shown). Each pulse results in alternately activating and deactivating of the lighting means 18. The plunger mechanism 74 should be made of a strong and lightweight substance, such as plastic.

FIG. 1 also illustrates a perspective view of the preferred securing means 28. This securing means 28 comprises, in combination, a horizontal aperture 88 in the upper portion 90 of the plunger mechanism 74 for a link 38 to be inserted therethrough. Additionally, the link 38 is also secured to the clip member 92, which is removably secured to either a pet collar 30 (not shown), a backpack 32 (not shown), or an article of clothing 36 (not shown). Both the link 38 and the clip member 92 should be made of strong, yet light substances. The most preferred substance to comprise the link 38 and the clip member 92 is steel. It is to be understood that the link 38 may comprise a key ring 38a (not shown).

Figure 2:
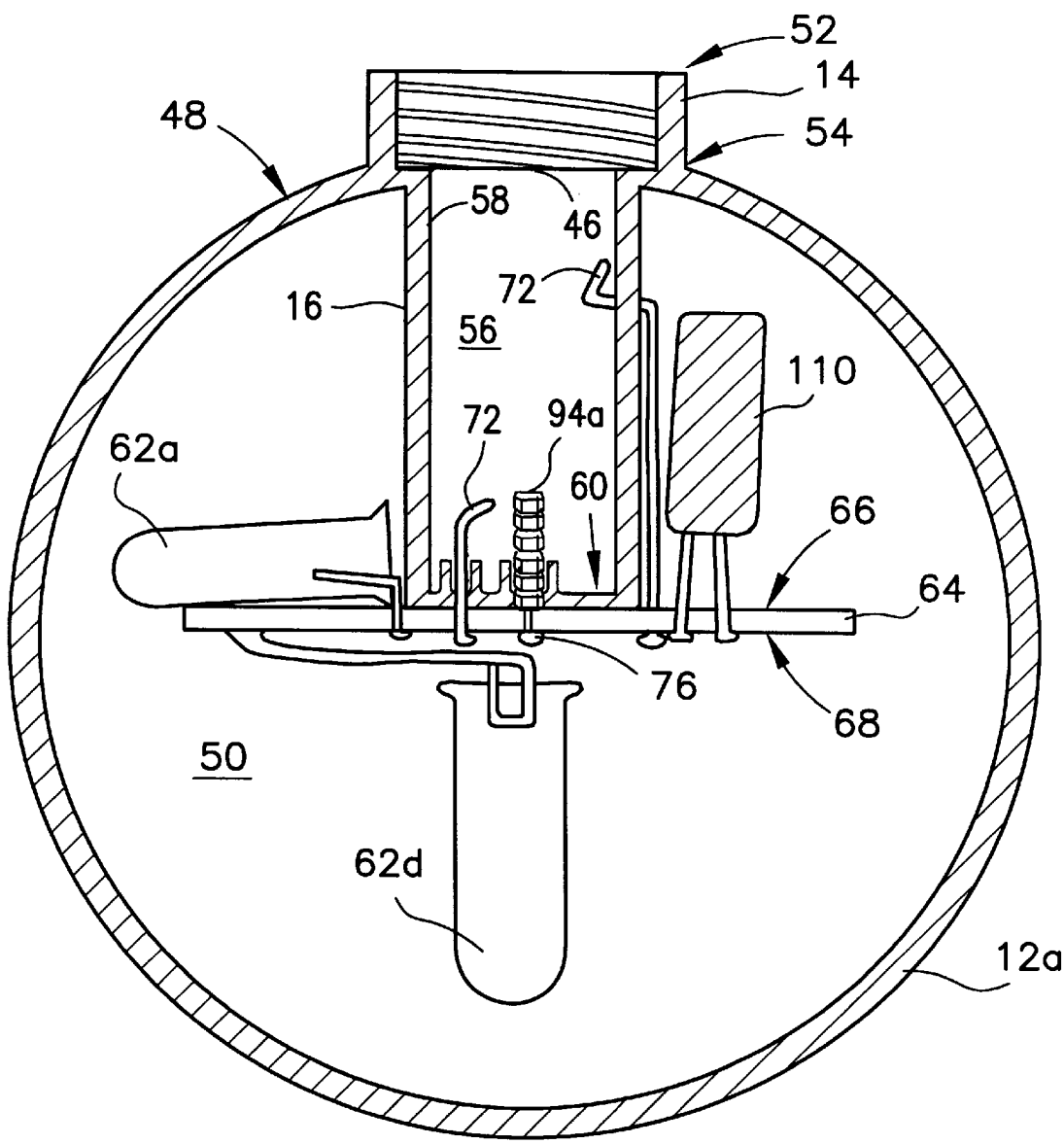
FIG. 2 is an exploded elevational view illustrating the novel combination safety strobe device 10 before all components are attached, wherein the spherical housing 12a is shown in a partial cut-away view along line 2—2 in FIG. 1 to illustrate the components attached therein.

Now referring to FIG. 2, it shows an exploded elevational view of the novel strobe device 10 before its component parts are attached. In particular, the spherical housing 12 is shown in a partial cut-away view along line 2—2 in FIG. 1. Within the inner cavity 50 of the spherical housing 12 contains the lighting means 18, the circuit board 64, and the cylindrical casing 16. The threaded neck portion 14 is attached to the top end 48 of the spherical housing 12. The passageway 56 connecting the cylindrical casing 16 and the neck portion 14 is visible in FIG. 2.

The lighting means 18 should be secured within the inner cavity 50 and be visible from 360 degrees around the housing 12 when illuminated. FIG. 2 illustrates the preferred lighting means 18 as four light emitting diodes (LEDs) 62 secured to a circuit board 64. The LEDs 62 are arranged for optimal viewing 360 degrees around the novel device 10 in that three of the LEDs 62a–62c are in a triangular formation on the top side 66 of the circuit board 64, while the remaining LED 62d is attached to the bottom side 68 (not shown in FIG. 2) of the circuit board 64. The LEDs 62 are preferably those having model number PCS-50 LEDs that are commercially available.

Still referring to FIG. 2, the powering means 20 preferably comprises a battery source 70 placed within the passageway 56 of the cylindrical casing 16. The most preferred battery source 70 comprises a top button cell battery 70a and a bottom button cell battery 70b, each having a positive (+) charge and a negative (−) charge. The top button cell battery 70a is placed on top of the bottom button cell battery 70b with their respective positive charges facing upward. The battery source 70 powers the novel combination safety strobe device 10 by transferring electric energy to the LEDs 62a–62d via a positive spring 72 and a negative spring 73.

The positive spring 72 touches the positive charge of each battery 70a and 70b, while the negative spring 73 touches the negative charge of the bottom button cell battery 70b. Each spring 72 and 73 is secured onto the circuit board 64 and extends into the passageway 56 of the cylindrical casing 16 by insertion therethrough. A hole 61a located on the closed end 60 of the cylindrical casing 16 allows for insertion of the negative spring 73 into the passageway 56 thereof, while an open edge 75 on the cylindrical casing 16 allows for insertion of the positive spring 72 into the passageway 56 thereof. As the positive 72 and negative 73 springs are secured on the circuit board 64, they necessarily are in electrical contact with the circuitry 22 attached to the bottom side 68 of the circuit board 64. In this way, the batteries 70a and 70b transfer energy through the positive 72 and negative 73 springs to the circuitry 22 and the LEDs 62a–62d, thereby providing power to the LEDs 62a–62d. The circuitry 22 is of a conventional type known in the art. All of the LEDs 62a–62d are preferably attached to the circuit board 64 in the conventional manner. The circuit board 64 is typically secured to the closed end 60 of the cylindrical casing 16 by inserting screws 96 (not shown) from the bottom side 68 of the circuit board 64 upwardly therethrough and into the closed end 60 of the cylindrical casing 16.

As discussed above, a contact 76 is also attached to the top side 66 of the circuit board 64 and extends upward through another hole 61b on the closed end 60 of the cylindrical casing 16 into the passageway 56 when the circuit board 64 is attached to the closed end 60 thereof. This contact 76 comes in contact with the bottom button cell batteries 70b when the batteries 70a and 70b are inserted into the cylindrical casing 16. The function of the contact 76 is to alternately activate and deactivate the LEDs 62a–62d by transmitting a pulse when coming in contact with the bottom button cell battery 70b. FIG. 2 also shows a capacitor 110 attached to the top side 66 of the circuit board 64. This capacitor is of a conventional type that is known in the art.

The covering means 26 covers the open passageway 56 at the top end 52 of the neck portion 14. The covering means 26 is preferably threaded thereabout to match the preferred threaded neck portion 14 for securing thereto. The most preferred covering means 26 is a cap member 78 having a top edge 80, a bottom edge 82, a vertical aperture 84 therethrough, and a threaded lower portion 86. The threaded lower portion 86 engages with and securely covers the threaded neck portion 14. The vertical aperture 84 has a size that allows the plunger mechanism 74 to fit therethrough. The plunger mechanism 74 should be able to slide freely in a vertical manner within the aperture 84 of the cap member 78. The covering means 26 should be made of a strong and lightweight substance, such as plastic.

Also shown in FIG. 2 is the preferred embodiment of the plunger mechanism 74, in that a plunger spring 94 is positioned to surround the lower portion 98 of the plunger mechanism 74.

The upper portion 90 of the plunger mechanism 74 is inserted upwardly through the vertical aperture 84 of the cap member 78. A circular extension 108 located between the upper 90 and lower 98 portions of the plunger mechanism 74 prevents the plunger mechanism 74 from being released when positioned within the vertical aperture 84 of the cap member 78. A preferred washer 100 having one large central hole 102 and three small holes 104 surrounding the large hole 102 is inserted upward to meet the bottom edge 82 of the cap member 78, so that the three stems 106 of the cap member 78 engage the small holes 104 of the washer for secure attachment thereto. In this way, the plunger spring 94 will oppose the downward pressure of the plunger mechanism 74 and automatically return the plunger mechanism 74 to its resting position (shown in FIG. 3). The preferred plunger mechanism 74 has an upper portion 90 that has a larger diameter than the lower portion 98 thereof, but other variations in the design of the plunger mechanism 74 are known to one of skill in the art. It is also preferred that the plunger mechanism 74 be made of a strong, yet light substance, such as plastic.

Figure 3:
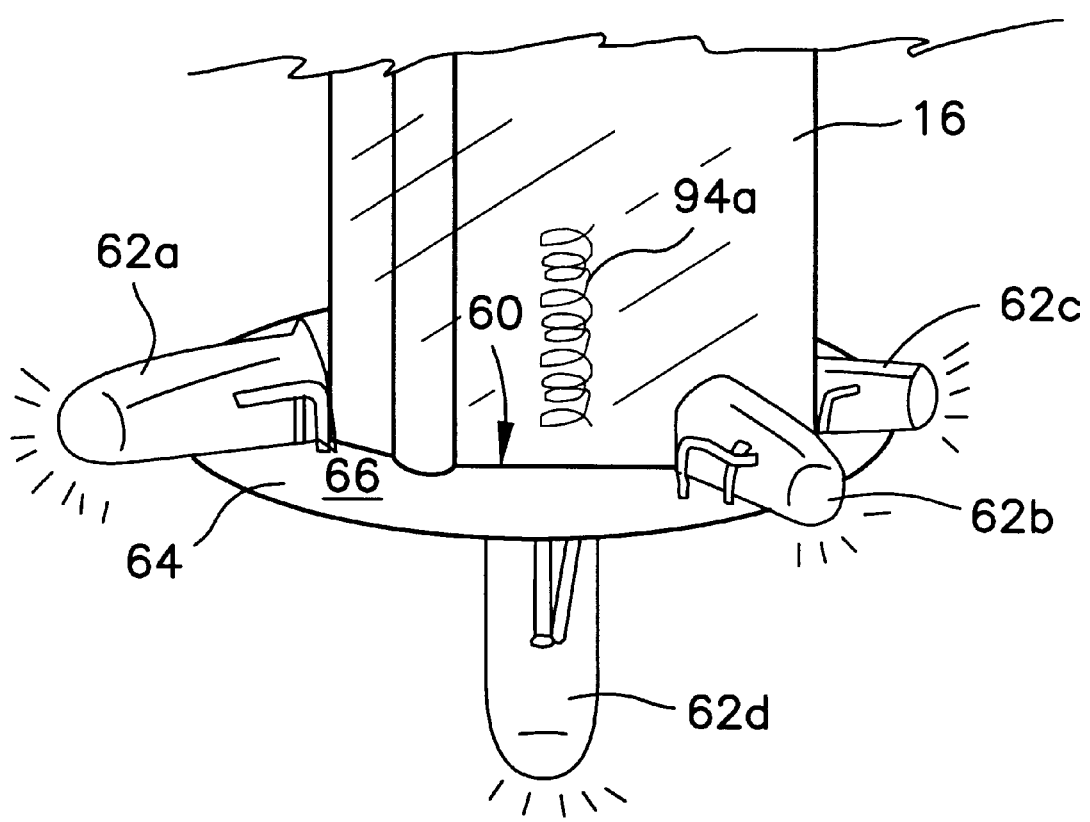
FIG. 3 is an enlarged sectional view of the novel strobe device 10 along line 2—2 in FIG. 1.

FIG. 3 displays the enlarged sectional view of the novel device 10 along line 2—2 in FIG. 1. The button cell batteries 70a and 70b are placed on top of each other within the cylindrical casing 16 and on the negative spring 73, and also touch the positive spring 72. The plunger mechanism 74 is in a resting position, whereby the lower portion 98 thereof is flush with the bottom edge 82 of the cap member 78. Alternately, the lower portion 98 of the plunger mechanism 74 will be flush with the washer 100 if the washer is used 100 in the manner shown in FIG. 2.

Figure 4:
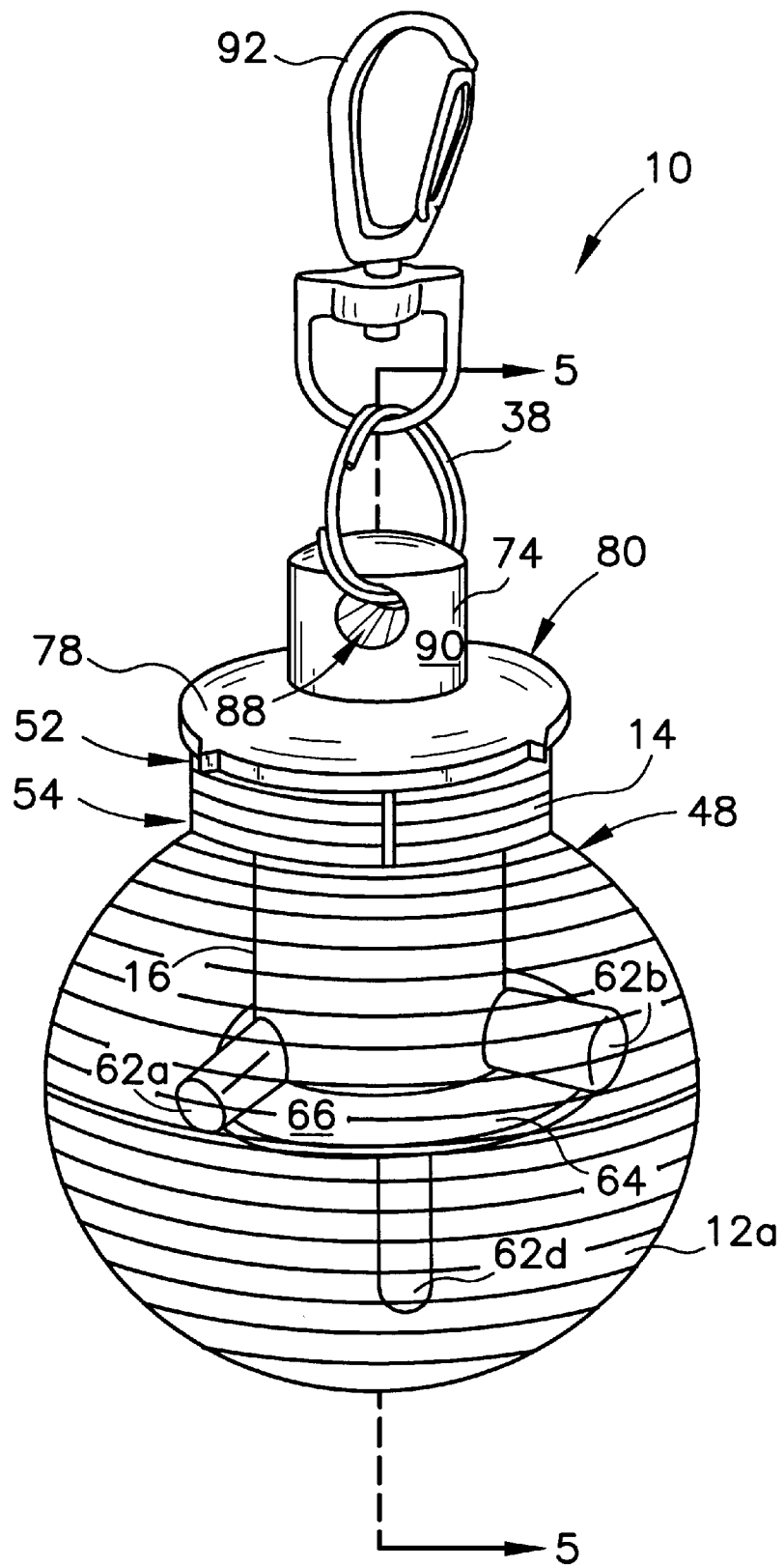
FIG. 4 is an enlarged sectional view of the novel strobe device 10 illustrated in FIG. 3 with the addition of the activating means 24 being pressed downward, shown by arrow X.

FIG. 4 shows the same view as FIG. 3, but illustrates the plunger mechanism 74 being pressed downward, as indicated by arrow X. When the plunger mechanism 74 is pressed downward, it compresses the plunger spring 94 placed inside the vertical aperture 84 (not shown in FIG. 4) of the cap member 78, which results in the lower portion 98 of the plunger mechanism 74 extending beyond the bottom edge 82 of the cap member 78 to press downward on the button cell batteries 70a and 70b. This puts downward pressure on the contact 76 extending into the cylindrical casing 16, which results in the transmission of electrical pulses to alternately activate and deactivate the circuitry 22 and LEDs 62a and 62d (the other two LEDs 62b and 62c are not shown in FIGS. 3, 4 and 6 to simplify the illustrations and descriptions).

Figure 5:
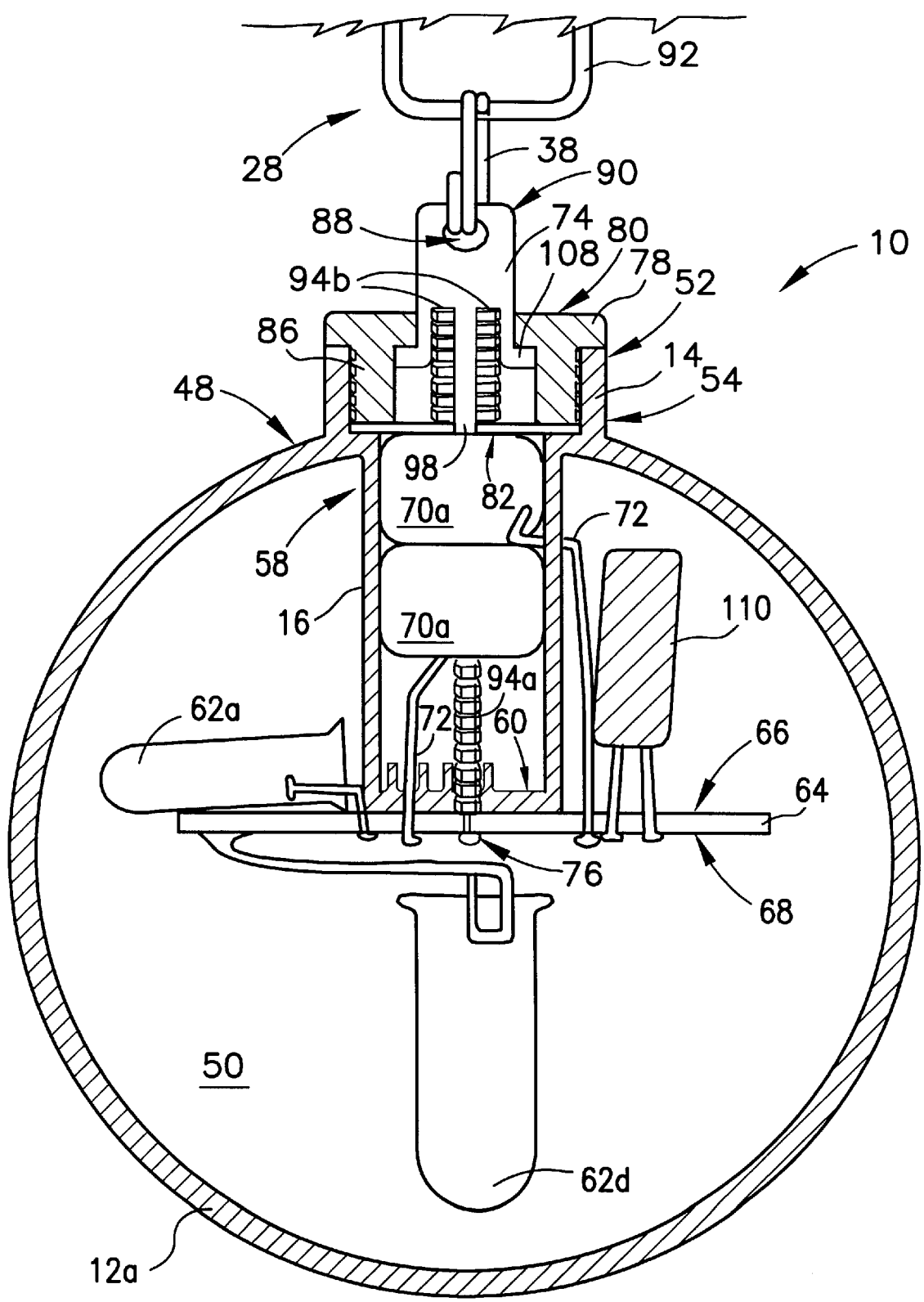
FIG. 5 is a perspective view illustrating the novel combination strobe device 10 with a rubber cap 112 secured thereon.

FIG. 5 illustrates a perspective view of a rubber cap 112 secured over the cap member 78 (not shown in FIG. 5) of the novel strobe device 10. This rubber cap 112 has a horizontal bore 114 therethrough for securement of the link 38 and clip member 92, or any other securing means 28. The rubber cap 112 must be flexible enough so that when it is pressed downwardly, the plunger mechanism 74 will also move in a downward manner to activate and deactivate the lighting means 18. The function of the rubber cap 112 is to ensure that water does not seep into the novel device 10 through its cap member 78 when the device 10 is submerged under water. Thus, the rubber cap 112 allows the novel device 10 to be a waterproof strobe light.

Figure 6:
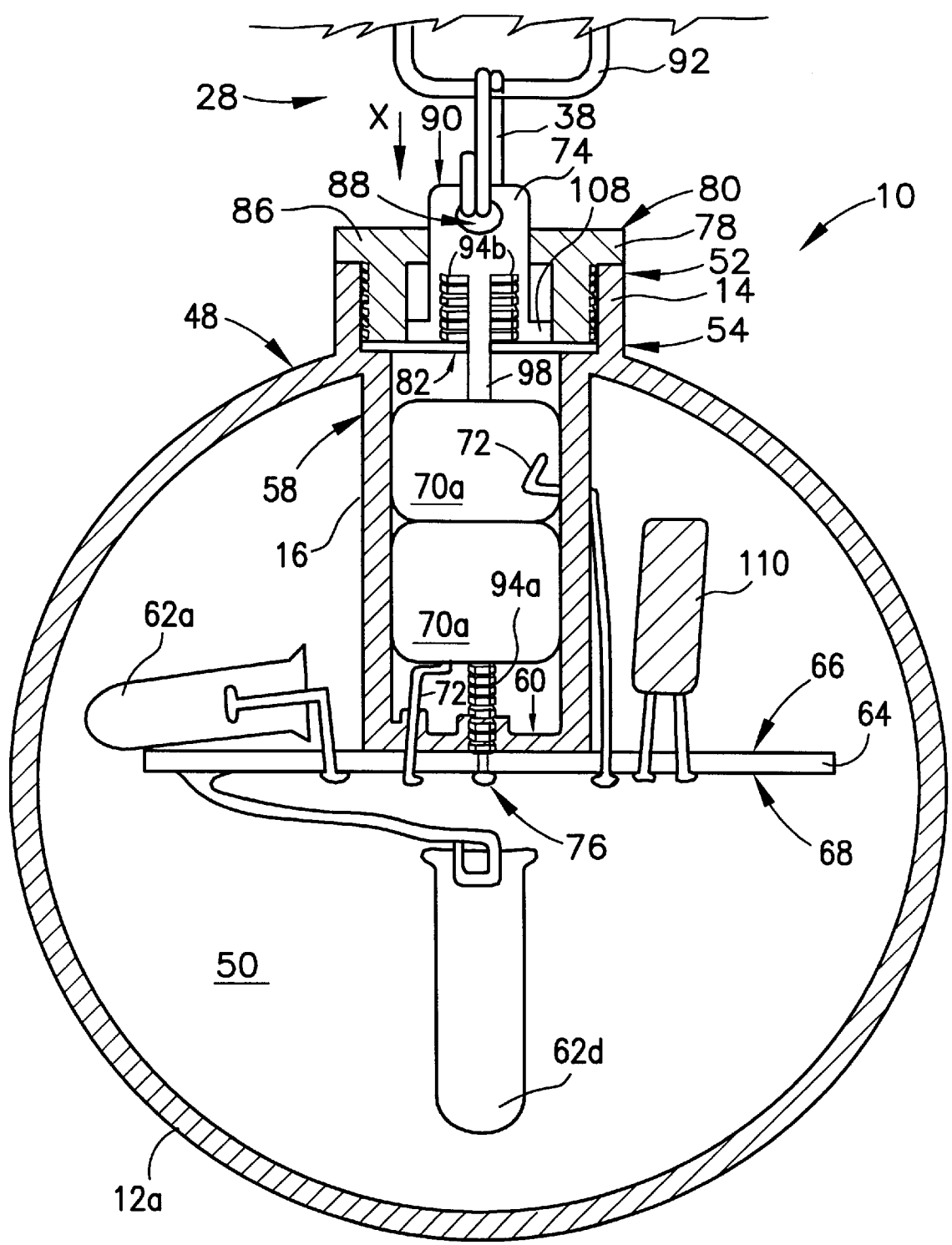
FIG. 6 is a sectional view of the novel strobe device 10 along line 6—6 in FIG. 5 illustrating the attachment of the rubber cap 112 thereon.
Figure 7:
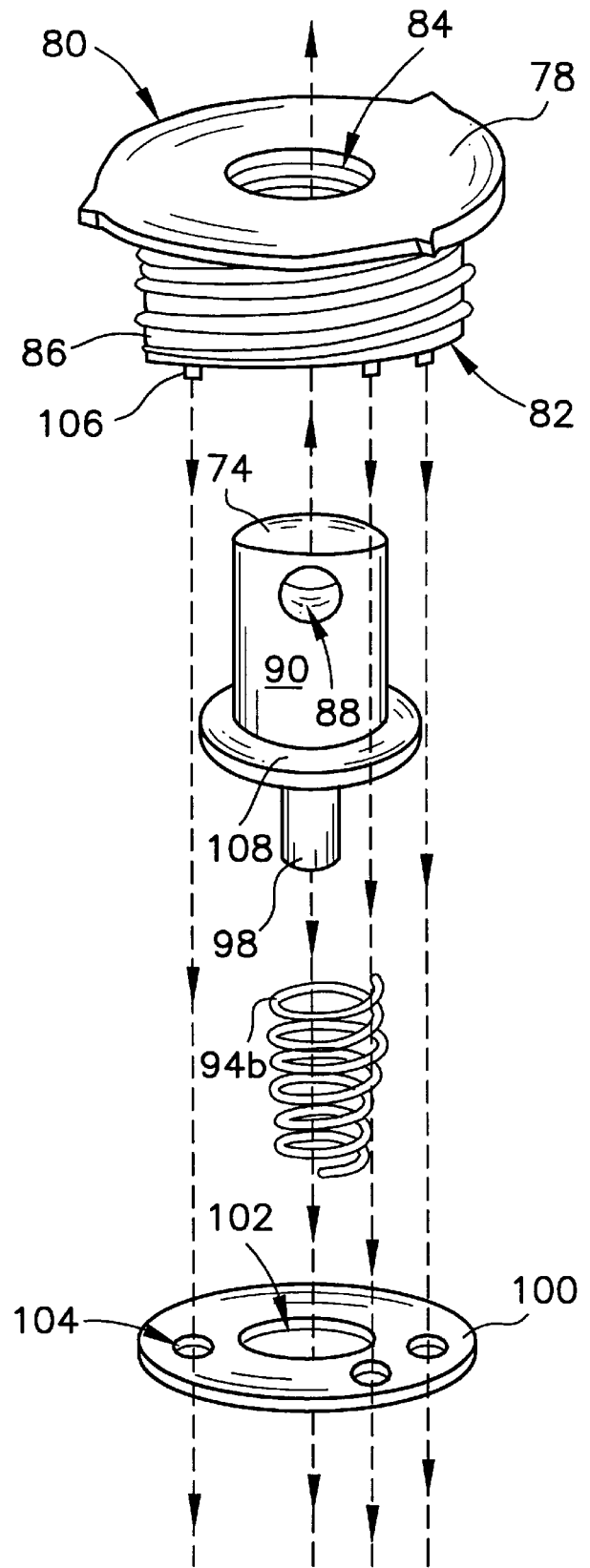
FIG. 7 is an exploded perspective view of the plunger mechanism of the novel strobe device.

FIG. 6 shows a sectional view along line 6—6 in FIG. 5. The cap member 78 is now visible under the cover of the rubber cap 112. Other components of the novel safety strobe device 10 are the same as described hereinbefore.

Hence, while the invention has been described in connection with a preferred embodiment, it will be understood that it is not intended that the invention be limited to that embodiment. On the contrary, it is intended to cover all alternatives, modifications and equivalents as may be included within the spirit and scope of the invention as disclosed.

As to the manner of usage and operation of the instant invention, same should be apparent from the above disclosure, and accordingly no further discussion relevant to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A combination safety strobe device adapted for use on a pet collar, a backpack, a key chain and an article of clothing, the combination safety strobe device comprising:
   (a) a translucent housing, the housing being spherical, the housing having a circular opening at a top end and an inner cavity therein, the spherical housing allowing light to pass therethrough;
   (b) a neck portion having a top end, a bottom end and a passageway therebetween, the bottom end being sized to match the opening of the housing and being attached thereto;
   (c) a cylindrical casing having an open end and a closed end, the cylindrical casing being fitted within the housing through the neck portion, the closed end of the cylindrical casing being positioned within the inner cavity of the housing, the open end of the cylindrical casing being flush with the bottom end of the neck portion to provide a continuous passageway therebetween;
   (d) means for lighting the housing, the lighting means being secured within the inner cavity of the housing;
   (e) means for powering the lighting means, the powering means being removably secured within the cylindrical casing;
   (f) circuitry for electrically connecting the powering means and the lighting means;
   (g) means for activating the lighting means, the activating means being engaged with the powering means to alternately activate and deactivate the lighting means;
   (h) means for covering the top end of the neck portion; and
   (i) means for removably securing the strobe device to one of the pet collar, the backpack, the key chain and the article of clothing, wherein the securing means is further secured to the covering means.

2. The combination safety strobe device of claim 1 wherein the spherical housing comprises a spherical housing made up of two halves attached together.

3. The combination safety strobe device of claim 1 wherein the lighting means comprises at least one light emitting diode (LED).

4. The combination safety strobe device of claim 1 wherein the lighting means comprises four LEDs, the LEDs being positioned within the housing so that emitted light may be viewed from 360 degrees around the housing.

5. The combination safety strobe device of claim 1 wherein the powering means comprises a battery source.

6. The combination safety strobe device of claim 5 wherein the battery source comprises:
   (a) a top button cell battery having a positive charge and a negative charge; and
   (b) a bottom button cell battery having a positive charge and a negative charge, whereby the top button cell battery is placed horizontally on top of the bottom button cell battery within the cylindrical casing such that the negative charges of both the top and bottom button cell batteries are facing downward.

7. The combination safety strobe device of claim 6 further comprising:
   (a) a positive spring positioned to touch the positive charges of the top and bottom button cell batteries, the positive spring being secured to the circuitry and extending into the passageway of the cylindrical casing; and
   (b) a negative spring positioned to touch the negative charges of the top and bottom button cell batteries, the negative spring being secured to the circuitry and extending into the passageway of the cylindrical casing,
   whereby the positive and negative springs transfer power from the button cell batteries to the circuitry and lighting means.

8. The combination safety strobe device of claim 1 wherein the neck portion and the covering means, respectively, comprise:
   (a) a neck portion that is threaded therein; and
   (b) a covering means that is threaded thereabout to match the threaded neck portion, whereby the neck portion and the covering means form an air-tight seal when threadedly engaged.

9. The combination safety strobe device of claim 8 wherein:
   (a) the covering means comprises a cap member having a threaded lower portion that fits within the neck portion, the cap member further having a vertical aperture therethrough, a top edge and a bottom edge;
   (b) the activating means comprises a plunger mechanism and a plunger spring secured vertically through the vertical aperture of the cap member and being freely movable therethrough, the plunger mechanism having an upper portion that extends above the cap member, the plunger mechanism further having a lower portion that is inserted through the plunger spring and is flush with the bottom edge of the cap member when in a resting position, whereby the lower portion of the plunger mechanism extends beyond the bottom edge of the cap member when the plunger mechanism is pressed downward; and
   (c) the circuitry comprises:
      (1) a circuit board having a top side and a bottom side, the top side of the circuit board being secured to the closed end of the cylindrical casing, the circuitry being attached to the bottom side of the circuit board, wherein the lighting means is secured on the top and bottom sides of the circuit board, and
      (2) a contact attached to the top side of the circuit board, the contact extending into the passageway of the cylindrical casing,
   whereby the lower portion of the plunger mechanism engages the powering means when pressed downward, thereby moving the powering means downward to touch the contact to alternately activate and deactivate the circuitry to, respectively, turn the lighting means on and off.

10. The combination safety strobe device of claim 9 wherein the lighting means comprises four LEDs, whereby three of the LEDs are positioned in a triangular arrangement around the top side of the circuit board and the remaining LED is positioned on the bottom side of the circuit board, thereby allowing the LEDs to be visible from 360 degrees around the housing when illuminated.

11. The combination safety strobe device of claim 9 wherein the plunger mechanism comprises a plunger mechanism having a lower portion that has a smaller diameter Man an upper portion thereof.

12. The combination safety strobe device of claim 9 wherein the plunger mechanism and the securing means, respectively, comprise:
   (a) a plunger mechanism having an upper portion with a horizontal aperture therethrough; and
   (b) a securing means comprising:
      (1) a link removably inserted through the horizontal aperture of the plunger mechanism for securing therethrough; and
      (2) a clip member removably inserted through the link for securing thereto, whereby the clip member is further removably secured to one of the pet collar, the backpack, the key chain and the article of clothing.

13. The combination safety strobe device of claim 1 further comprising a rubber cap, the rubber cap being sized to fit over the covering means, whereby the rubber cap is secured over the covering means to ensure the safety strobe device is waterproof.

14. The combination safety strobe device of claim 13 wherein the rubber cap comprises a rubber cap having a horizontal bore therethrough, whereby the bore allows for securement of the securing means.

15. A combination safety strobe device adapted for use on a pet collar, a backpack, a key chain and an article of clothing, the combination safety strobe device comprising:
   (a) a spherical housing having a circular opening at a top end and an inner cavity therein, the spherical housing being translucent;
   (b) a neck portion being threaded therein, the neck portion having a top end, a bottom end and a passageway therebetween, the bottom end being sized to match the opening of the spherical housing and being attached thereto;
   (c) a cylindrical casing having an open end and a closed end, the cylindrical casing being fitted within the spherical housing through the neck portion, the closed end of the cylindrical casing being positioned within the inner cavity of the spherical housing, the open end of the cylindrical casing being flush with the bottom end of the neck portion to provide a continuous passageway therebetween;
   (d) a circuit board having a top side and a bottom side, the top side being secured to the closed end of the cylindrical casing;
   (e) four light emitting diodes (LEDs) for lighting the spherical housing, wherein three of the LEDs are positioned in a triangular arrangement around the top side of the circuit board and the remaining LED is positioned on the bottom side of the circuit board, thereby allowing the LEDs to be visible from 360 degrees around the spherical housing when illuminated;
   (f) circuitry attached to the bottom side of the circuit board for electrically connecting the circuit board and the LEDs;
   (g) a top button cell battery having a positive charge and a negative charge;
   (h) a bottom button cell battery having a positive charge and a negative charge, wherein the top button cell battery is placed horizontally on top of the bottom button cell battery within the cylindrical casing such that the negative charges of both the top and bottom button cell batteries are facing downward;
   (i) a positive spring positioned to touch the positive charges of the top and bottom button cell batteries, the positive spring being secured to the top side of the circuit board and extending into the passageway of the cylindrical casing;
   (j) a negative spring positioned to touch the negative charges of the top and bottom button cell batteries, the negative spring being secured to the top side of the circuit board and extending into the passageway of the cylindrical casing, wherein the positive and negative springs transfer power from the button cell batteries to the circuitry and the LEDs;
   (k) a contact attached to the top side of the circuit board, the contact extending into the passageway of the cylindrical casing;
   (l) a cap member for covering the top end of the neck portion, the cap member having a threaded lower portion that fits within the neck portion for threaded engagement thereto, the cap member further having a vertical aperture therethrough, a top edge and a bottom edge;
   (m) a plunger mechanism secured vertically through the vertical aperture of the cap member and freely movable therethrough, the plunger mechanism further having an upper portion that extends above the cap member and a lower portion that is flush with the bottom edge of the cap member when in a resting position, the upper portion having a horizontal aperture therethrough, whereby the lower portion of the plunger mechanism extends beyond the bottom edge of the cap member and engages the top button cell battery when the plunger mechanism is pressed downward, thereby alternately moving the top and bottom button cell batteries downward to touch the contact and to activate and deactivate the circuitry to, respectively, turn the LEDs on and off;
   (n) a link removably inserted through the horizontal aperture of the upper portion of the plunger mechanism for securing thereto; and
   (o) a clip member removably inserted through the link for securing thereto,
   whereby the clip member is further removably secured to one of the pet collar, the backpack, the key chain and the article of clothing.

16. A combination safety strobe device adapted for use on a pet collar, a backpack, a key chain and an article of clothing, the combination safety strobe device comprising:
   (a) a spherical housing having a circular opening at a top end and an inner cavity therein, the spherical housing being translucent;
   (b) a neck portion being threaded therein, the neck portion having a top end, a bottom end and a passageway therebetween, the bottom end being sized to match the opening of the spherical housing and being attached thereto;
   (c) a cylindrical casing having an open end and a closed end, the cylindrical casing being fitted within the spherical housing through the neck portion, the closed end of the cylindrical casing being positioned within the inner cavity of the spherical housing, the open end of the cylindrical casing being flush with the bottom end of the neck portion to provide a continuous passageway therebetween;

(d) a circuit board having a top side and a bottom side, the top side being secured to the closed end of the cylindrical casing;

(e) four light emitting diodes (LEDs) for lighting the spherical housing, wherein three of the LEDs are positioned in a triangular arrangement around the top side of the circuit board and the remaining LED is positioned on the bottom side of the circuit board, thereby allowing the LEDs to be visible from 360 degrees around the spherical housing when illuminated;

(f) circuitry attached to the bottom side of the circuit board for electrically connecting the circuit board and the LEDs;

(g) a top button cell battery having a positive charge and a negative charge;

(h) a bottom button cell battery having a positive charge and a negative charge, wherein the top button cell battery is placed horizontally on top of the bottom button cell battery within the cylindrical casing such that the negative charges of both the top and bottom button cell batteries are facing downward;

(i) a positive spring positioned to touch the positive charges of the top and bottom button cell batteries, the positive spring being secured to the top side of the circuit board and extending into the passageway of the cylindrical casing;

(j) a negative spring positioned to touch the negative charges of the top and bottom button cell batteries, the negative spring being secured to the top side of the circuit board and extending into the passageway of the cylindrical casing, wherein the positive and negative springs transfer power from the button cell batteries to the circuitry and the LEDs;

(k) a contact attached to the top side of the circuit board, the contact extending into the passageway of the cylindrical casing;

(l) a cap member for covering the top end of the neck portion, the cap member having a threaded lower portion that fits within the neck portion for threaded engagement thereto, the cap member further having a vertical aperture therethrough, a top edge and a bottom edge;

(m) a plunger mechanism secured vertically through the vertical aperture of the cap member and freely movable therethrough, the plunger mechanism further having an upper portion that extends above the cap member and a lower portion that is flush with the bottom edge of the cap member when in a resting position, the upper portion having a horizontal aperture therethrough, whereby the lower portion of the plunger mechanism extends beyond the bottom edge of the cap member and engages the top button cell battery when the plunger mechanism is pressed downward, thereby alternately moving the top and bottom button cell batteries downward to touch the contact and to activate and deactivate the circuitry to, respectively, turn the LEDs on and off;

(n) a rubber cap having a horizontal bore therethrough, the rubber cap being sized to fit over the cap member, whereby the rubber cap is secured over the cap member to ensure that the safety strobe device is waterproof;

(o) a link removably inserted through the horizontal bore of the rubber cap for securing thereto; and (p) a clip member removably inserted through the link for securing thereto, whereby the clip member is further removably secured to one of the pet collar, the backpack, the key chain and the article of clothing.

17. A combination safety strobe device adapted for use on a pet collar, a backpack, a key chain and an article of clothing, the combination safety strobe device comprising:

(a) a housing having a circular opening at a top end and an inner cavity therein, the housing allowing light to pass therethrough;

(b) a neck portion having a top end, a bottom end and a passageway therebetween, the bottom end being sized to match the opening of the housing and being attached thereto;

(c) a cylindrical casing having an open end and a closed end, the cylindrical casing being fitted within the housing through the neck portion, the closed end of the cylindrical casing being positioned within the inner cavity of the housing, the open end of the cylindrical casing being flush with the bottom end of the neck portion to provide a continuous passageway therebetween;

(d) a lighting means comprising at least four LEDs, the LEDs being positioned within the housing so that emitted light may be viewed from 360 degrees around the housing (e) means for powering the lighting means, the powering means being removably secured within the cylindrical casing;

(f) circuitry for electrically connecting the powering means and the lighting means;

(g) means for activating the lighting means, the activating means being engaged with the powering means to alternately activate and deactivate the lighting means;

(h) means for covering the top end of the neck portion; and (i) means for removably securing the strobe device to one of the pet collar, the backpack, the key chain and the article of clothing, wherein the securing means is further secured to the covering means.

18. The combination safety strobe device of claim 17 wherein the housing comprises a translucent spherical housing.

19. The combination safety strobe device of claim 18 wherein the spherical housing comprises a spherical housing made up of two halves attached together.

20. The combination safety strobe device of claim 17 wherein the powering means comprises a battery source.

21. The combination safety strobe device of claim 20 wherein the battery source comprises:

(a) a top button cell battery having a positive charge and a negative charge; and (b) a bottom button cell battery having a positive charge and a negative charge, whereby the top button cell battery is placed horizontally on top of the bottom button cell battery within the cylindrical casing such that the negative charges of both the top and bottom button cell batteries are facing downward.

22. The combination safety strobe device of claim 21 further comprising:

(a) a positive spring positioned to touch the positive charges of the top and bottom button cell batteries, the positive spring being secured to the circuitry and extending into the passageway of the cylindrical casing; and (b) a negative spring positioned to touch the negative charges of the top and bottom button cell batteries, the negative spring being secured to the circuitry and extending into the passageway of the cylindrical casing, whereby the positive and negative springs transfer power from the button cell batteries to the circuitry and lighting means.

23. The combination safety strobe device of claim 17 wherein the neck portion and the covering means, respectively, comprise:
   (a) a neck portion that is threaded therein; and
   (b) a covering means that is threaded thereabout to match the threaded neck portion, whereby the neck portion and the covering means form an air-tight seal when threadedly engaged.

24. The combination safety strobe device of claim 23 wherein:
   (a) the covering means comprises a cap member having a threaded lower portion that fits within the neck portion, the cap member further having a vertical aperture therethrough, a top edge and a bottom edge;
   (b) the activating means comprises a plunger mechanism and a plunger spring secured vertically through the vertical aperture of the cap member and being freely movable therethrough, the plunger mechanism having an upper portion that extends above the cap member, the plunger mechanism further having a lower portion that is inserted through the plunger spring and is flush with the bottom edge of the cap member when in a resting position, whereby the lower portion of the plunger mechanism extends beyond the bottom edge of the cap member when the plunger mechanism is pressed downward; and
   (c) the circuitry comprises:
      (1) a circuit board having a top side and a bottom side, the top side of the circuit board being secured to the closed end of the cylindrical casing, the circuitry being attached to the bottom side of the circuit board, wherein the lighting means is secured on the top and bottom sides of the circuit board, and
      (2) a contact attached to the top side of the circuit board, the contact extending into the passageway of the cylindrical casing, whereby the lower portion of the plunger mechanism engages the powering means when pressed downward, thereby moving the powering means downward to touch the contact to alternately activate and deactivate the circuitry to, respectively, turn the lighting means on and off.

25. The combination safety strobe device of claim 24 wherein the lighting means comprises four LEDs, whereby three of the LEDs are positioned in a triangular arrangement around the top side of the circuit board and the remaining LED is positioned on the bottom side of the circuit board, thereby allowing the LEDs to be visible from 360 degrees around the housing when illuminated.

26. The combination safety strobe device of claim 24 wherein the plunger mechanism comprises a plunger mechanism having a lower portion that has a smaller diameter than an upper portion thereof.

27. The combination safety strobe device of claim 24 wherein the plunger mechanism and the securing means, respectively, comprise:
   (a) a plunger mechanism having an upper portion with a horizontal aperture therethrough; and
   (b) a securing means comprising:
      (1) a link removably inserted through the horizontal aperture of the plunger mechanism for securing therethrough; and
      (2) a clip member removably inserted through the link for securing thereto, whereby the clip member is further removably secured to one of the pet collar, the backpack, the key chain and the article of clothing.

28. The combination safety strobe device of claim 17 further comprising a rubber cap, the rubber cap being sized to fit over the covering means, whereby the rubber cap is secured over the covering means to ensure the safety strobe device is waterproof.

29. The combination safety strobe device of claim 28 wherein the rubber cap comprises a rubber cap having a horizontal bore therethrough, whereby the bore allows for securement of the securing means.

* * * * *